United States Patent
Yilmaz

(10) Patent No.: US 10,331,255 B2
(45) Date of Patent: Jun. 25, 2019

(54) INTEGRATED PIXEL DISPLAY AND TOUCH SENSOR

(71) Applicant: Atmel Corporation, Chandler, AZ (US)

(72) Inventor: Esat Yilmaz, Santa Cruz, CA (US)

(73) Assignee: Atmel Corporation, Chandler, AZ (US)

( * ) Notice: Subject to any disclaimer, the term of this patent is extended or adjusted under 35 U.S.C. 154(b) by 0 days.

(21) Appl. No.: 15/874,149

(22) Filed: Jan. 18, 2018

(65) Prior Publication Data

US 2018/0143722 A1    May 24, 2018

Related U.S. Application Data

(62) Division of application No. 14/983,064, filed on Dec. 29, 2015, now Pat. No. 9,874,963, which is a division of application No. 13/715,677, filed on Dec. 14, 2012, now Pat. No. 9,244,559.

(51) Int. Cl.
| | |
|---|---|
| G06F 3/041 | (2006.01) |
| G02F 1/1333 | (2006.01) |
| G06F 3/044 | (2006.01) |
| G02F 1/1343 | (2006.01) |

(52) U.S. Cl.
CPC ........ G06F 3/0412 (2013.01); G02F 1/13338 (2013.01); G02F 1/134309 (2013.01); G06F 3/044 (2013.01); G06F 3/0416 (2013.01); G06F 2203/04108 (2013.01)

(58) Field of Classification Search
CPC .. G06F 3/041–047; G06F 2203/04101–04113; G02F 1/13338; G02F 1/134309; G09G 3/36–3696

USPC .................................. 345/87–104, 173–178
See application file for complete search history.

(56) References Cited

U.S. PATENT DOCUMENTS

| | | |
|---|---|---|
| 4,814,760 A | 3/1989 | Johnston et al. |
| 6,995,550 B2 | 2/2006 | Jacobson et al. |
| 7,663,607 B2 | 2/2010 | Hotelling et al. |
| 7,864,503 B2 | 1/2011 | Chang |

(Continued)

FOREIGN PATENT DOCUMENTS

| | | |
|---|---|---|
| WO | 2009131292 A1 | 10/2009 |
| WO | 2009133503 A1 | 11/2009 |
| WO | 2012129247 A2 | 9/2012 |

OTHER PUBLICATIONS

Myers, S. A. et al., "Electronic Devices With Concave Displays," U.S. Appl. No. 61/454,936, filed Mar. 21, 2011, 23 pages.

(Continued)

*Primary Examiner* — Stephen G Sherman
(74) *Attorney, Agent, or Firm* — Baker Botts L.L.P.

(57) ABSTRACT

In one embodiment, an apparatus includes a display component, a touch sensor component, and a touch-screen controller. The display component includes pixel-drive electrodes configured to display an image and the touch sensor component is configured to detect a touch input. The touch-screen controller, which is coupled to the touch sensor component, the display component, and the pixel-drive electrodes, is configured to generate a drive signal for the touch sensor component using the pixel-drive electrodes. The touch-screen controller is further configured to generate a pixel-drive signal for the display component using the pixel-drive electrodes.

20 Claims, 2 Drawing Sheets

(56) References Cited

U.S. PATENT DOCUMENTS

| | | | |
|---|---|---|---|
| 7,875,814 | B2 | 1/2011 | Chen et al. |
| 7,920,129 | B2 | 4/2011 | Hotelling et al. |
| 8,031,094 | B2 | 10/2011 | Hotelling et al. |
| 8,031,174 | B2 | 10/2011 | Hamblin et al. |
| 8,040,326 | B2 | 10/2011 | Hotelling et al. |
| 8,049,732 | B2 | 11/2011 | Hotelling et al. |
| 8,179,381 | B2 | 5/2012 | Frey et al. |
| 8,217,902 | B2 | 7/2012 | Chang et al. |
| 8,591,860 | B2 | 11/2013 | Kawakami et al. |
| 8,624,845 | B2 | 1/2014 | Grivna |
| 8,723,824 | B2 | 5/2014 | Myers et al. |
| 2008/0012835 | A1 | 1/2008 | Rimon et al. |
| 2008/0048989 | A1 | 2/2008 | Yoon et al. |
| 2008/0062139 | A1 | 3/2008 | Hotelling et al. |
| 2008/0062147 | A1 | 3/2008 | Hotelling et al. |
| 2008/0143689 | A1 | 6/2008 | Foo et al. |
| 2008/0238894 | A1 | 10/2008 | Ng et al. |
| 2008/0309627 | A1 | 12/2008 | Hotelling et al. |
| 2008/0309635 | A1 | 12/2008 | Matsuo |
| 2009/0109522 | A1 | 4/2009 | Paolini, Jr. et al. |
| 2009/0315854 | A1 | 12/2009 | Matsuo |
| 2010/0038030 | A1 | 2/2010 | Allen et al. |
| 2010/0044122 | A1 | 2/2010 | Sleeman et al. |
| 2010/0045632 | A1 | 2/2010 | Yilmaz et al. |
| 2010/0079384 | A1 | 4/2010 | Grivna |
| 2010/0148993 | A1 | 6/2010 | Lee |
| 2010/0149108 | A1 | 6/2010 | Hotelling et al. |
| 2010/0194699 | A1* | 8/2010 | Chang .................. G06F 3/0412 345/173 |
| 2010/0194707 | A1 | 8/2010 | Hotelling et al. |
| 2011/0007011 | A1 | 1/2011 | Mozdzyn |
| 2011/0025635 | A1 | 2/2011 | Lee |
| 2011/0025639 | A1 | 2/2011 | Trend et al. |
| 2011/0031042 | A1 | 2/2011 | Wu et al. |
| 2011/0109566 | A1 | 5/2011 | Meng |
| 2011/0109622 | A1 | 5/2011 | Son et al. |
| 2011/0254802 | A1 | 10/2011 | Philipp |
| 2011/0310459 | A1 | 12/2011 | Gates et al. |
| 2012/0044190 | A1 | 2/2012 | Yilmaz |
| 2012/0242568 | A1 | 9/2012 | Myers et al. |
| 2012/0242592 | A1 | 9/2012 | Rothkopf et al. |
| 2012/0243151 | A1 | 9/2012 | Lynch |
| 2012/0243719 | A1 | 9/2012 | Franklin et al. |
| 2013/0076612 | A1 | 3/2013 | Myers |

OTHER PUBLICATIONS

Lynch, S. B., "Electronic Devices With Convex Displays," U.S. Appl. No. 61/454,950, filed Mar. 21, 2011, 28 pages.

Rothkopf, F. R. et al., "Electronic Devices With Flexible Displays," U.S. Appl. No. 61/454,894, filed Mar. 21, 2011, 41 pages.

Yilmaz, E., U.S. Appl. No. 12/859,874, Non-final Office Action, dated Oct. 11, 2012.

Yilmaz, E., U.S. Appl. No. 12/859,874, Amendment to Non-final Office Action, dated Feb. 11, 2013.

Yilmaz, E., U.S. Appl. No. 12/859,874, Final Office Action, dated Jun. 5, 2013.

Yilmaz, E., U.S. Appl. No. 12/859,874, RCE and Amendment, dated Sep. 5, 2013.

Yilmaz, E., U.S. Appl. No. 12/859,874, Non-final Office Action, dated Sep. 15, 2014.

Yilmaz, E., U.S. Appl. No. 12/859,874, Amendment to Non-final Office Action, dated Mar. 15, 2015.

Yilmaz, E., U.S. Appl. No. 12/859,874, Non-final Office Action, dated Apr. 20, 2015.

Yilmaz, E., U.S. Appl. No. 12/859,874, Amendment to Non-final Office Action, dated Jul. 20, 2015.

Yilmaz, E., U.S. Appl. No. 12/859,874, Non-final Office Action, dated Aug. 12, 2015.

Yilmaz, E., U.S. Appl. No. 13/715,677, Non-final Office Action, dated Oct. 9, 2014.

Yilmaz, E., U.S. Appl. No. 13/715,677, Amendment to Non-final Office Action, dated Feb. 9, 2015.

Yilmaz, E., U.S. Appl. No. 13/715,677, Final Office Action, dated Mar. 4, 2015.

Yilmaz, E., U.S. Appl. No. 13/715,677, Amendment to Final Office Action, dated May 4, 2015.

Yilmaz, E., U.S. Appl. No. 13/715,677, Applicant Initiated Interview Summary, dated May 4, 2015.

Yilmaz, E., U.S. Appl. No. 13/715,677, Notice of Allowance, dated Sep. 18, 2015.

Yilmaz, E., U.S. Appl. No. 12/859,874, Response to Non-Final Office Action, dated Feb. 12, 2016.

Yilmaz, E., U.S. Appl. No. 12/859,874, Final Office Action, dated Jun. 2, 2016.

Yilmaz, E., U.S. Appl. No. 12/859,874, Request for Continued Examination and Amendment filed Oct. 3, 2016.

Yilmaz, E., U.S. Appl. No. 12/859,874, Non-final Office Action dated Nov. 9, 2016.

Yilmaz, E., U.S. Appl. No. 12/859,874, Response to Non-final Office Action filed Feb. 9, 2017.

Yilmaz, E., U.S. Appl. No. 14/983,064, Restriction Requirement, dated Apr. 27, 2016.

Yilmaz, E., U.S. Appl. No. 14/983,064, Response to Restriction Requirement, dated Jun. 13, 2016.

Yilmaz, E., U.S. Appl. No. 14/983,064, Non-final Office Action dated Jul. 8, 2016.

Yilmaz, E., U.S. Appl. No. 14/983,064, Response to Non-Final Office Action, dated Oct. 11, 2016.

Yilmaz, E., U.S. Appl. No. 14/983,064, Non-final Office Action dated Nov. 10, 2016.

Yilmaz, E., U.S. Appl. No. 14/983,064, Response to Non-Final Office Action, dated Mar. 10, 2017.

Yilmaz, E., U.S. Appl. No. 14/983,064, Final Office Action, dated Mar. 29, 2017.

Yilmaz, E., U.S. Appl. No. 14/983,064, Request for Continued Examination and Amendment filed Jul. 31, 2017.

Yilmaz, E., U.S. Appl. No. 14/983,064, Notice of Allowance, dated Sep. 28, 2017.

* cited by examiner

INTEGRATED PIXEL DISPLAY AND TOUCH SENSOR

RELATED APPLICATION

This application claims the benefit, under 35 U.S.C. § 120, as a divisional of U.S. patent application Ser. No. 14/983,064, filed Dec. 29, 2015, entitled Integrated Pixel Display and Touch Sensor, incorporated herein by reference, which is a divisional under 35 U.S.C. § 120 of U.S. patent application Ser. No. 13/715,677, filed Dec. 14, 2012 and entitled Integrated Pixel Display and Touch Sensor, incorporated herein by reference.

TECHNICAL FIELD

This disclosure generally relates to integrated pixel displays and touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
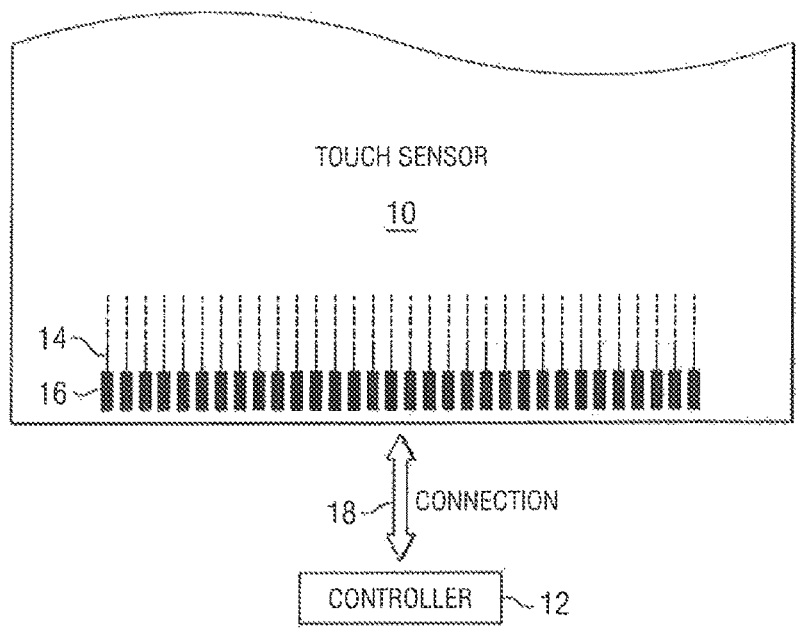
FIG. 1 illustrates an example touch sensor with an example controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference, to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material and/or may be included in a display stack. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a drive electrode or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM) such as for example copper, silver, or a copper- or silver-based material and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fills having particular patterns, this disclosure. contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more microfeatures of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. In certain embodiments, the conductive material used for the drive or sense electrodes may also be used for a portion of the display screen (e.g., the same conductive material may be used for the sense electrodes of a touch sensor and for the reference voltage layer of a display screen). In some embodiments, the mechanical stack may be within or comprise a portion of a display stack configured to generate images. As an example and not by way of limitation, the mechanical stack may include a first layer of optically clear adhesive (OCA) beneath a cover panel of a display stack. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between a layer or substrate of the display stack and the substrate with the conductive material forming the drive or sense electrodes. The substrate with the conductive material may provide a benefit or feature in producing an image (e.g., it may be a layer or substrate found in a typical, non-touch, display stack) or it may be a layer added specifically to provide a substrate on which the electrodes are formed. In some embodiments, the mechanical stack may also include a second layer of OCA. In some embodiments, the mechanical stack may also include a dielectric layer (which may be made of polyethylene terephthalate (PET) or another suitable material, similar to the substrate with the conductive material forming the drive or sense electrodes). As an alternative, where appropriate, a thin coating of a dielectric material may be applied instead of the second layer of OCA and/or the dielectric layer. The second layer of OCA may be disposed between the substrate with the conductive material making up the drive or sense electrodes and the dielectric layer, and the dielectric layer may be disposed between the second layer of OCA and another layer of the display stack. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any writable materials and having any suitable thicknesses.

In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a trautual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self capacitance implementation, electrodes of only a single type may be disposed in a pattern on a single substrate, in addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, or application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10. The FPC may be active or passive, where appropriate. In particular embodiments, multiple touch-sensor controllers 12 are disposed on the FPC. Touch-sensor controller 12 may include a processor unit, a drive unit, a sense unit, a display unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes, The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. This disclosure contemplates any suitable connection 18 between touch-sensor controller 12 and touch sensor 10.

Figure 2:
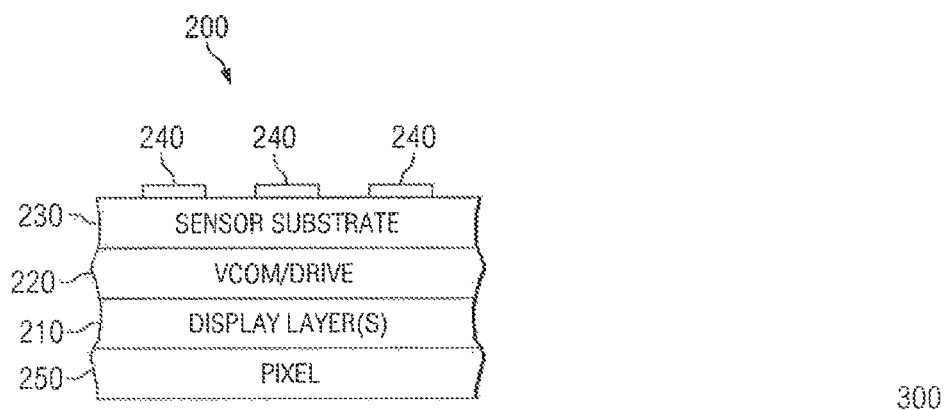
FIG. 2 illustrates a profile view of a portion of an example touch screen in which a pixel layer provides a pixel-drive signal to a display layer of a LCD, and a reference voltage layer provides the display layer of the LCD with a reference voltage and provides an integrated touch sensor with a drive signal.

FIG. 2 illustrates a profile view of a portion of an example touch screen in which a pixel layer provides a pixel-drive signal to a display layer of a LCD, and a reference voltage layer provides the display layer of the LCD with a reference voltage and provides an integrated touch sensor with a drive signal. Touch screen 200 includes a stack of layers that provide both an image, via a display portion, and touch sensing, via an integrated touch sensor. The display portion of touch screen 200 is configured to provide images through a two-dimensional array of pixels. The touch sensor is configured to determine a relative location of a touch input within touch screen 200. The depicted layers of touch screen 200 are display layer(s) 210, reference voltage layer 220, sensor substrate 230, sense electrodes 240, and pixel layer 250. Additional layers of touch screen 200 are not depicted. For example, touch screen 300 may include one or more layers, materials, and/or components above sense electrodes 240, below pixel layer 250, and/or in-between any of the other depicted layers of touch screen 200.

Display layer(s) 210 may include pixels which provide images for touch screen 200. Display layer(s) 210 may include any suitable number of layers of touch screen 200.

For example, display layer(s) 210 may include a single display layer or more than one display layer. In some embodiments, display layer(s) 210 may be a liquid crystal layer that adjusts a polarization of light passing through the layer. In some embodiments, display layer(s) 210 may be the liquid crystal layer and any combination of one or more glass substrate layers with electrodes and or one or more polarizing filter layers. In some embodiments, display layer(s) 210 may include VCOM layer(s) and/or pixel layer(s).

The color of the pixels of display layer(s) 210 may be determined, in part, based on an electrical potential between a pixel layer 250 and reference voltage layer 220 The reference voltage may be referred to as a common voltage or VCOM. In addition to providing a reference voltage for display layer(s) 210, reference voltage layer 220 may also provide the drive signal for a touch sensor. For example, in the embodiment depicted in FIG. 2, the touch sensor portion of touch screen 200 may include sense electrodes 240, sensor substrate 230, and reference voltage layer 220. In such an embodiment, reference voltage layer 220 may act as the drive electrodes of a touch sensor. This may allow the same layer, reference voltage layer 220, to provide both a reference voltage for display layer(s) 210 and a drive signal for a touch sensor.

Reference voltage layer 220 may he electrically conductive so as to provide both the reference voltage and the drive signal. In certain embodiments, the reference voltage layer 220 may comprise ITO. In some embodiments, reference voltage layer 220 may include fine lines of metal. The fine lines of metal may be used to provide both the reference voltage for display layer(s) 210 as well as the drive signals for the touch sensor. In some embodiments, the fine lines of metal may be arranged in a mesh configuration. In some embodiments, the fine lines of metal, may be electrically isolated drive lines that are all pulsed simultaneously to provide the reference voltage for display layer(s) 210. In some embodiments, the fine lines of metal may be electrically isolated drive lines that are each pulsed one at a time to provide drive signals to sense electrodes 240. In some embodiments, instead of pulsing each of the electrically isolated drive lines one at a time to provide drive signals to sense electrodes 240, two or more of the electrically isolated drive lines (such as, for example, two of the electrically isolated drive lines, three of the electrically isolated drive lines, or any other number of the electrically isolated drive lines) may be pulsed simultaneously to provide drive signals to sense electrodes 240.

In the depicted embodiment, sensor substrate 230 is located between sense electrodes 240 and reference voltage layer 220. In some embodiments, sensor substrate 230 may comprise an additional layer that would not be fund in a traditional non-touch sensitive LCD display stack. In some such embodiments, sensor substrate 230 may comprise non-birefringent material. The use of a non-birefringent material may avoid undesirable twisting of the light passing through the material. In some embodiments, sensor substrate 230 may comprise an existing layer that would be found in a traditional non-touch sensitive LCD display stack. For example, sensor substrate 230 may be a color filter layer of an LCD display stack. In some embodiments, sensor substrate 230 may comprise multiple layers, Pixel layer 250 may be configured to change the characteristics of the crystals within display layer(s) 210 (e.g., to change the image to be displayed by touch screen 200), In particular embodiments, pixel layer 250 may comprise a two-dimensional array of pixel electrodes. The size of the two-dimensional array of pixel electrodes may correspond to the number of display pixels of touch screen 200 (e.g., each pixel to be displayed may have its own respective pixel electrode(s)). In some embodiments, each pixel electrode may he individually controlled to generate an image.

Although the depicted embodiment includes an LCD display stack, other embodiments may comprise other types of display stacks (e.g., any display stack that includes a reference voltage layer). For example, in some embodiments, an organic light emitting diode (OLED) display stack may be used for touch screen 200.

Figure 3:
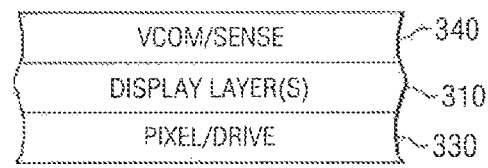
FIG. 3 illustrates a profile view of a portion of an example touch screen in which a pixel-drive layer provides a pixel-drive signal to a display layer of a LCD and a drive signal to an integrated touch sensor, and a reference voltage layer provides a reference voltage for the display layer of the LCD and provides a sense signal to a touch screen controller.

FIG. 3 illustrates a profile view of a portion of an example touch screen in which a pixel-drive layer provides a pixel-drive signal to a display layer of a LCD and a drive signal to an integrated touch sensor, and a reference voltage layer provides a reference voltage for the display layer of the LCD and provides a sense signal to a touch screen controller. Similar to touch screen 200, touch screen 300 provides both an image and touch sensitivity. In FIG. 3, touch screen 300 may include several layers. The depicted layers of touch screen 300 include voltage layer 340, display layer(s) 310, and pixel-drive layer 330. Additional layers of touch screen 300 are not depicted. For example, touch screen 300 may include one or more layers, materials, and/or components above voltage layer 340, below pixel-drive layer 330, and/or in-between any of the other depicted layers of touch screen 300.

In the embodiment depicted in FIG. 3, the drive and sense electrodes of a touch sensor are implemented through pixel-drive layer 330 and reference voltage layer 340, respectively. These layers also provide their traditional functionality for display layer(s) 310.

For example, pixel-drive layer 330 may be configured to change the characteristics of the crystals within display layer(s) 310 (e.g., to change the image to be displayed by touch screen 300) and may be configured to provide a drive signal for a touch sensor; and reference voltage layer 340 may be configured to provide a reference voltage for display layer(s) 310 and may be configured to provide sense signals to a touch screen controller (i.e., where the sense signals are provided by the reference voltage layer 340 as a result of the drive signals provided to the reference voltage layer 340 by pixel-drive layer 330). In addition, in the depicted embodiment, display layer(s) 310 may also act as the sensor substrate for the touch sensor.

In particular embodiments, pixel-drive layer 330 may comprise a two-dimensional array of pixel-drive electrodes, The size of the two-dimensional array of pixel-drive electrodes may correspond to the number of display pixels of touch screen 300 (e.g., each pixel to be displayed may have its own respective pixel-drive electrode). While the pixel-drive electrodes may be individually controlled to generate an image, in some embodiments they may be grouped together to provide drive signals for the touch sensor. For example, one or more rows of pixel-drive electrodes may be used collectively as a single drive electrode (e.g., the same drive signal may be sent to all the pixel-drive electrodes within one or more rows pixel drive electrodes).

In some embodiments, one or both of pixel-drive layer 330 and reference voltage layer 340 may comprise fine lines of metal, in particular embodiments, the fine lines of metal for pixel-drive layer 330 and/or reference voltage layer 340 may be arranged in a mesh fashion. In some embodiments, fine lines of metal may be connected between the pixel-drive electrodes and a touch screen controller. Although the depicted embodiment includes an LCD display stack, other embodiments may comprise other types of display stacks (e.g., any display stack that includes a reference voltage layer). For example, in some embodiments, an organic light emitting diode (OLED) display stack may be used for touch screen 300.

Figure 4:
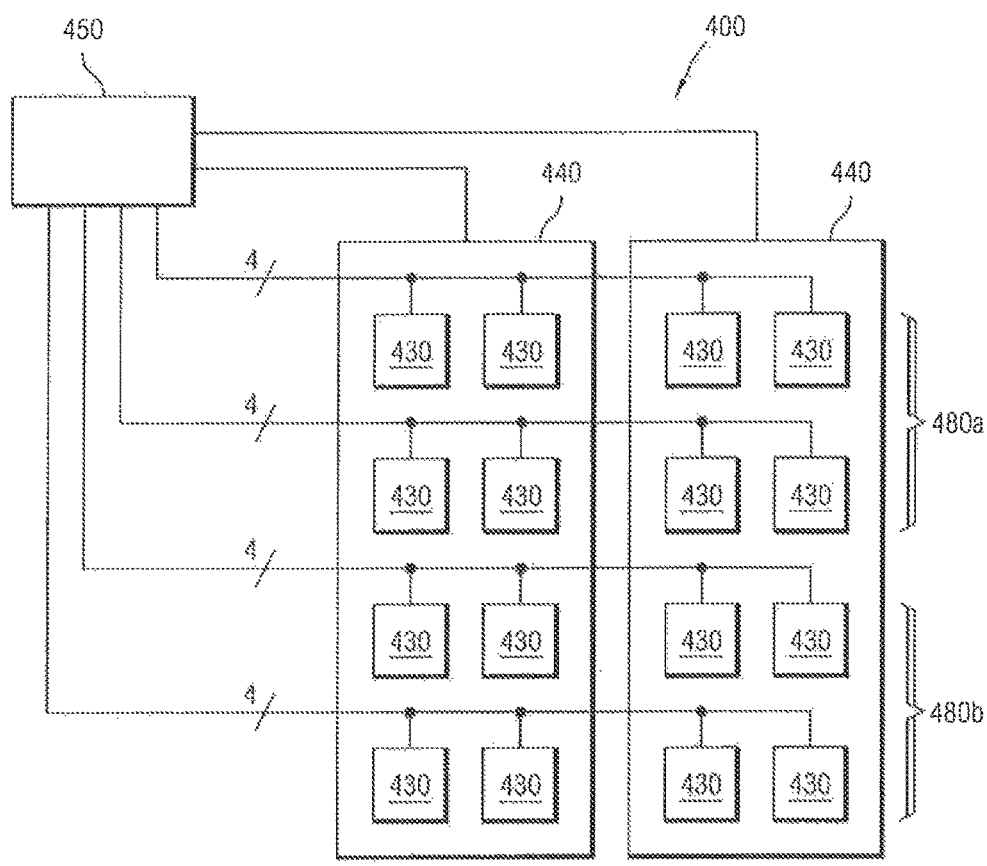
FIG. 4 illustrates an overhead view of an example touch screen in which pixel-drive electrodes provide a display portion of a touch screen with a pixel-drive signal and provide an integrated touch sensor of the touch screen with a drive signal.

FIG. 4 illustrates an overhead view of an example touch screen in which pixel-drive electrodes provide a display portion of a touch screen with a pixel-drive signal and provide an integrated touch sensor of the touch screen with a drive signal. In the depicted embodiment, touch screen 400 comprises a four-by-four display with an integrated two-by-two touch sensor, The four-by-four display comprises the individual pixels of display layer(s) (not depicted). Each pixel of the display has its own associated pixel-drive electrode 430. These pixel-drive electrodes 430 are grouped into subsets of pixel-drive electrodes 430 to form drive electrodes 480. The two-by-two touch sensor comprises sense electrodes 440 and the two subsets of pixel-drive electrodes 430 that form drive electrodes 480. In order to form drive electrodes 480, pixel-drive electrodes 430 are arranged into two subsets (drive electrode 480a and drive electrode 480b), each subset comprises a two-by-four array of pixel-drive electrodes 430. Controller 450 is separately connected to each pixel-drive electrode 430 and thus may treat pixel-drive electrodes 430 as separate entities when generating an image and collectively (as subsets) when generating a drive signal to determine a location of a touch input. In this embodiment, the sensor substrate (not shown), is located between sense electrodes 440 and drive electrodes 480.

In the depicted embodiment, touch screen controller 450 is connected to sense electrodes 440 as well as the individual pixel drive electrodes 430 that form drive electrodes 480. This may allow touch screen controller 450 to both adjust the pixel-drive signal to control the image generated by touch screen 400 and to manage the drive signal for the touch sensor used to determine the relative location of a touch input. Because pixel-drive electrodes 430 are used for both the touch sensor functionality and for creating the displayed image, touch screen controller 450 may need to synchronize how and when it sends pixel-drive signals and drive signals.

While the pixel-drive electrodes have been grouped together in rows in the depicted embodiment, some embodiments may group the pixel-drive electrodes into clusters (e.g., two-by-two clusters) or may not group them together at all. For example, sense electrodes 440 may separately detect a touch input based on a change in the charge, capacitance, or electrical potential from each of the individual pixel-drive electrodes.

Figure 5:
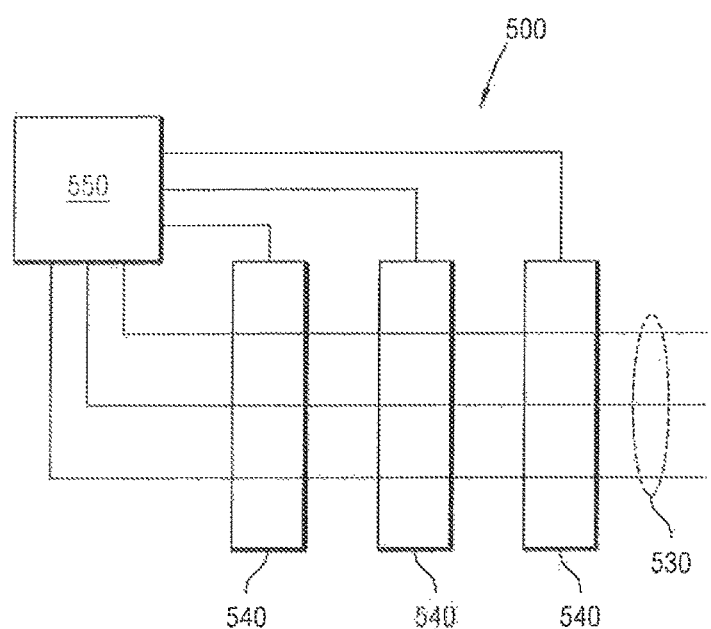
FIG. 5 illustrates an overhead view of an example touch screen in which a reference voltage layer provides a display portion of a touch screen with a reference voltage and provides an integrated touch sensor of the touch screen with a drive signal.

FIG. 5 illustrates an overhead view of an example touch screen in which a reference voltage layer provides a display portion of a touch screen with a reference voltage and provides an integrated touch sensor of the touch screen with a drive signal. In FIG. 5, touch screen 500 includes touch screen controller 550 coupled to drive electrodes 530 and sense electrodes 540. Drive electrodes 530 may he spaced so as to provide a reference voltage for a display layer(s) (not depicted). Drive electrodes 530 may also be configured to provide drive signals to a touch sensor, In some embodiments, drive electrodes 530 may be oriented perpendicularly to the orientation of sense electrodes 540. In some embodiments, drive electrodes 530 may be made of fine lines of metal. Touch screen controller 550 may use drive electrodes 530 to provide drive signals for a touch sensor and to provide a reference voltage for a display layer(s) (e.g., display layer(s) 210 of an LCD display stack). As discussed above with respect to FIG. 4, touch screen controller 550 may synchronize the reference voltage and the drive signals being sent over drive electrodes 530. Touch screen controller 550 may then use the sense signal provided by sense electrodes 540 to determine a relative location of a touch input.

Although FIGS. 1-5 have been described above as including particular components, the systems of FIGS. 1-5 may include any combination of any of the described components and any of the options or features described herein, as would be understood by one of ordinary skill in the art based upon the teachings of the disclosure. For example and not by way of limitation, any of the options or features described herein may be utilized in combination with the illustrated embodiments of FIGS. 1-5 and/or any number of the other options or features also described herein as would be understood by one of ordinary skill in the art based upon the teachings of the disclosure.

Herein, reference to a computer-readable non-transitory storage medium may include a semiconductor-based or other integrated circuit (IC), such as for example a field-programmable gate array (FPGA) or an application-specific IC (ASIC), a hard disk, an HUD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable medium, or a suitable combination of these, where appropriate, A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person haying ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus, comprising:
a display component comprising pixel-drive electrodes configured to display an image;
a touch sensor component configured to detect a touch input;
a touch-screen controller coupled to the touch sensor component, the display component, and the pixel-drive electrodes, the touch-screen controller configured to:
generate a drive signal for the touch sensor component using a first subset of the pixel-drive electrodes; and
generate a pixel-drive signal for the display component using a second subset of the pixel-drive electrodes, wherein the first subset is different than the second subset;

wherein the touch-screen controller is separately connected to each of the pixel-drive electrodes such that the touch-screen controller treats the pixel-drive electrodes as separate entities when generating the pixel-drive signal to display the image and collectively when generating the drive signal to detect the touch input.

2. The apparatus of claim 1, wherein the display component comprises an organic light emitting diode.

3. The apparatus of claim 1, wherein the display component comprises one or more display layers of a liquid crystal display.

4. The apparatus of claim 1, wherein the touch-screen controller is coupled to a reference voltage layer, the reference voltage layer configured to provide a reference voltage for the display component and a sense signal to the touch-screen controller.

5. The apparatus of claim 1, wherein the pixel-drive electrodes comprise a two-dimensional array of pixel-drive electrodes.

6. The apparatus of claim 1, wherein the touch-screen controller is connected to sense electrodes.

7. The apparatus of claim 1, wherein the pixel-drive electrodes are grouped into subsets of pixel-drive electrodes to form drive electrodes.

8. A controller comprising:
a processor; and
a memory comprising logic operable, when executed by the processor, to:
  generate a drive signal for a touch sensor component of a touch screen using a first subset of pixel-drive electrodes;
  detect a touch input using the touch sensor component;
  generate a pixel-drive signal for a display component of the touch screen using a second subset of the pixel-drive electrodes, wherein the first subset is different than the second subset; and
  display an image using the display component, the display component comprising the pixel-drive electrodes;
wherein the controller is coupled to the touch sensor component, the display component, and the pixel-drive electrodes; and
wherein the controller is separately connected to each of the pixel-drive electrodes such that the controller treats the pixel-drive electrodes as separate entities when generating the pixel-drive signal to display the image and collectively when generating the drive signal to detect the touch input.

9. The controller of claim 8, wherein the display component comprises an organic light emitting diode.

10. The controller of claim 8, wherein the display component comprises one or more display layers of a liquid crystal display.

11. The controller of claim 8, wherein the controller is further coupled to a reference voltage layer, the reference voltage layer configured to provide a reference voltage for the display component and a sense signal to the controller.

12. The controller of claim 8, wherein the pixel-drive electrodes comprise a two-dimensional array of pixel-drive electrodes.

13. The controller of claim 8, wherein the controller is connected to sense electrodes.

14. The controller of claim 8, wherein the pixel-drive electrodes are grouped into subsets of pixel-drive electrodes to form drive electrodes.

15. A method comprising;
generating a drive signal for a touch sensor component of a touch screen using a first subset of pixel-drive electrodes;
detecting a touch input using the touch sensor component;
generating a pixel-drive signal for a display component of the touch screen using a second subset of the pixel-drive electrodes, wherein the first subset is different than the second subset; and
displaying an image using the display component, the display component comprising the pixel-drive electrodes;
wherein a controller is separately connected to each of the pixel-drive electrodes such that the controller treats the pixel-drive electrodes as separate entities when generating the pixel-drive signal to display the image and collectively when generating the drive signal to detect the touch input.

16. The method of claim 15, wherein the display component comprises an organic light emitting diode.

17. The method of claim 15, wherein the display component comprises one or more display layers of a liquid crystal display.

18. The method of claim 15, further comprising providing a reference voltage for the display component.

19. The method of claim 15, wherein the pixel-drive electrodes comprise a two-dimensional array of pixel-drive electrodes.

20. The method of claim 15, wherein the pixel-drive electrodes are grouped into subsets of pixel-drive electrodes to form drive electrodes.

* * * * *